|| US011110678B2

(12) United States Patent
Pan

(10) Patent No.: US 11,110,678 B2
(45) Date of Patent: Sep. 7, 2021

(54) TREAD EXTENSION DEVICE FOR USE IN RETREAD FINISHING

(71) Applicant: Compagnie Generale des Etablissements Michelin, Clermont-Ferrand (FR)

(72) Inventor: Chinglin Pan, Mauldin, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 477 days.

(21) Appl. No.: 16/084,284

(22) PCT Filed: Mar. 20, 2017

(86) PCT No.: PCT/US2017/023174
§ 371 (c)(1),
(2) Date: Sep. 12, 2018

(87) PCT Pub. No.: WO2017/172399
PCT Pub. Date: Oct. 5, 2017

(65) Prior Publication Data
US 2019/0070817 A1 Mar. 7, 2019

Related U.S. Application Data

(63) Continuation of application No. PCT/US2016/025034, filed on Mar. 20, 2016.

(51) Int. Cl.
*B29D 30/54* (2006.01)
*B29D 30/52* (2006.01)
(Continued)

(52) U.S. Cl.
CPC ............ *B29D 30/54* (2013.01); *B23Q 3/10* (2013.01); *B24B 41/06* (2013.01);
(Continued)

(58) Field of Classification Search
CPC ........ B29D 2030/084; B29D 2030/086; B29D 2030/088; B29D 2030/541;
(Continued)

(56) References Cited

U.S. PATENT DOCUMENTS

| 604,067 | A | * | 5/1898 | Morgan | .................... B60C 7/22 |
| | | | | | 152/389 |
| 714,271 | A | * | 11/1902 | Alderfer | ............... B60C 15/024 |
| | | | | | 152/379.3 |

(Continued)

FOREIGN PATENT DOCUMENTS

| DE | 3731618 A1 | * | 4/1988 | ........... B62D 55/213 |
| GB | 190905465 A | * | 2/1910 | ............. B60C 5/007 |
| JP | S6287334 A | | 4/1987 | |

OTHER PUBLICATIONS

European Patent Office; International Search Report and Written Opinion for patent application PCT/US2016/025034; dated Nov. 23, 2016; Publisher: European Patent Office, Rijswijk, Netherlands, pp. 1-10, enclosed.

(Continued)

*Primary Examiner* — Orlando E Aviles
*Assistant Examiner* — Joel D Crandall
(74) *Attorney, Agent, or Firm* — Neal P. Pierotti

(57) ABSTRACT

A tread extension device (10) is provided that has first (12) and second (14) tread extensions for holding a tread during brushing operations. A first connecting device (28) connects the first tread extension (12) to a first longitudinal end (18) of the tread, and engages both the first tread extension (12) and the first longitudinal end (18) of the tread. A second
(Continued)

connecting device (30) is included that connects the second tread extension (14) to the second longitudinal end of the tread. The second connecting device (30) engages both the second tread extension and the second longitudinal end of the tread. The tread is able to be brushed in both a first direction and a second direction along its underside.

13 Claims, 6 Drawing Sheets

(51) Int. Cl.
| | |
|---|---|
| *B24B 41/06* | (2012.01) |
| *B23Q 3/10* | (2006.01) |
| *B29D 30/00* | (2006.01) |
| *B29D 30/44* | (2006.01) |

(52) U.S. Cl.
CPC ..... *B29D 30/0005* (2013.01); *B29D 30/0016* (2013.01); *B29D 30/44* (2013.01); *B29D 30/52* (2013.01); *B29D 2030/0038* (2013.01); *B29D 2030/4487* (2013.01)

(58) Field of Classification Search
CPC ........ B29D 2030/547; B29D 2030/548; B29D 2030/549; B29D 2030/705; B29D 30/54; B29D 30/0005; B29D 30/0016; B29D 30/44; B29D 30/52; Y10T 152/1045; F16G 3/08; F16G 3/14; F16G 3/003; F16G 3/006; F16G 3/02; F16G 3/00; B24B 41/06
USPC .......................................... 451/184, 300, 336
See application file for complete search history.

(56) References Cited

U.S. PATENT DOCUMENTS

| | | | | |
|---|---|---|---|---|
| 1,399,180 | A * | 12/1921 | Bailey | B60C 7/102 |
| | | | | 152/318 |
| 1,706,354 | A * | 3/1929 | Geist | F16G 7/00 |
| | | | | 24/31 R |
| 2,479,985 | A * | 8/1949 | Teemsma | B60B 15/021 |
| | | | | 152/375 |
| 2,815,520 | A | 10/1957 | Schanz | |
| 3,327,358 | A * | 6/1967 | Schick | F16G 3/02 |
| | | | | 24/33 R |
| 4,207,776 | A * | 6/1980 | Helt | F16G 5/16 |
| | | | | 24/31 B |
| 4,845,897 | A | 11/1989 | Holst | |
| 5,136,832 | A * | 8/1992 | Sund | A01D 41/10 |
| | | | | 24/31 B |
| 5,246,100 | A * | 9/1993 | Stone | F16G 3/00 |
| | | | | 198/844.2 |
| 6,379,486 | B1 * | 4/2002 | Freeman | B29C 65/56 |
| | | | | 156/137 |
| 6,516,943 | B2 * | 2/2003 | Engle | F16G 3/00 |
| | | | | 198/844.2 |
| 2009/0301845 | A1 * | 12/2009 | DeGroot | F16G 3/02 |
| | | | | 198/844.2 |
| 2015/0115497 | A1 | 4/2015 | Colby | |
| 2015/0158342 | A1 * | 6/2015 | Fujimoto | B60C 17/04 |
| | | | | 152/520 |

OTHER PUBLICATIONS

European Patent Office; International Search Report and Written Opinion for patent application PCT/US2017/023174; dated Jun. 13, 2017; Publisher: European Patent Office, Rijswijk, Netherlands, pp. 1-10, enclosed.

* cited by examiner

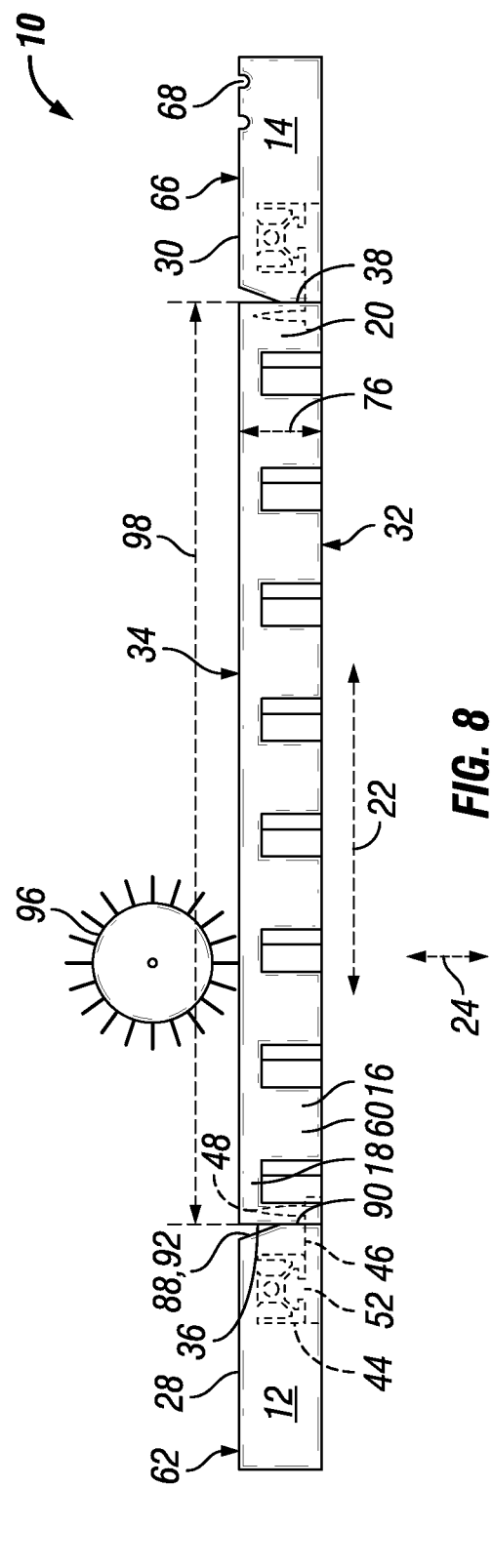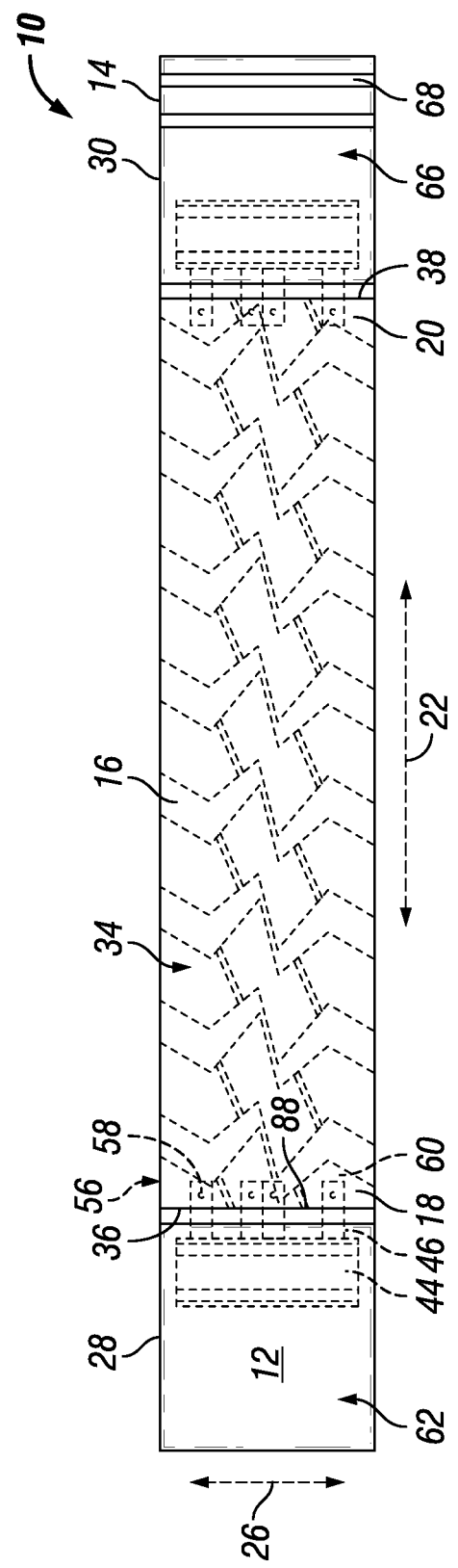

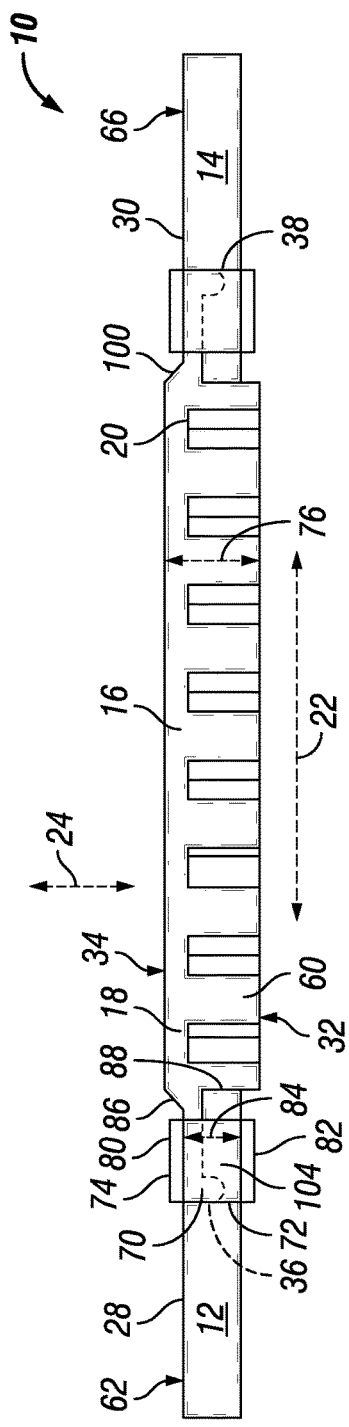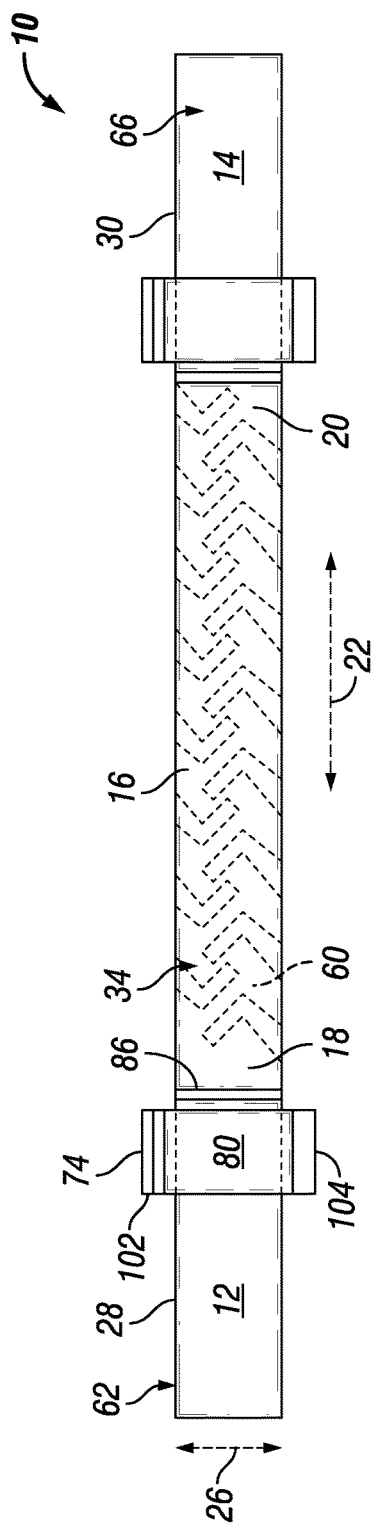

TREAD EXTENSION DEVICE FOR USE IN RETREAD FINISHING

CROSS-REFERENCE TO RELATED APPLICATIONS

The present application is a 35 U.S.C. § 371 application of PCT/US17/23174 filed on Mar. 20, 2017 and entitled "Tread Extension Device for Use in Retread Finishing." PCT/US17/23174 claims the benefit of PCT/US16/25034 filed on Mar. 30, 2016 and entitled "Tread Extension Device for Use in Retread Finishing." PCT/US17/23174 and PCT/US16/25034 are both incorporated by reference herein in their entireties for all purposes.

FIELD OF THE INVENTION

The present invention relates generally to a tread finishing device that is used in a retreading process. More particularly, the present application involves a tread extension device that secures to a piece of tread to allow the piece of tread to be brushed in two directions along its entire length to result in improved finishing quality in a retreading process.

BACKGROUND

The retreading of tires involves the molding of a new section of tread that has a tread surface and an underside surface opposite from the tread surface. In order to attach the underside surface to the tire carcass that is being reused, the underside surface must be brushed to prepare the surface for attachment. The tread section is provided in the form of a longitudinal strip, and an end of the strip is held while the strip is fed into a brush machine. FIG. 1 shows the underside surface 34 of a tread 16 that has a first longitudinal end 18 and a second longitudinal end 20. For a 10 meter long tread 16, the first longitudinal end 18 is one meter in length and is held while the rest of the tread 16 is fed into the brushing machine. The brushing machine brushes the entire underside surface 34 in a first direction 40 except for the first longitudinal end 18 that is covered by the device holding the tread 16.

In order to brush the first longitudinal end 18 so that the entire underside surface 34 is prepared, the opposite second longitudinal end 20 may next be held and the tread 16 can again be fed into the brushing machine. This second brushing causes the underside surface 34 to be brushed in a second direction 42 so that the first longitudinal end 18 is prepared. However, holding of the second longitudinal end 20 prevents it from being brushed in the second direction 42 as it is covered by the holding instrument. The resulting tread 16 thus has first and second longitudinal ends 18 and 20 that are brushed in one direction (40 or 42), and an intermediate section between these two ends 18, 20 that is brushed in both the first direction 40 and the second direction 42. For a 10 meter long tread 16, the middle 8 meters may be brushed in both directions 40, 42 while a meter on one side and a meter on the other side of the middle 8 meters are brushed in only one direction 40 or 42. The reason the tread 16 must be firmly held on an end during brushing is due to the forces applied by the brushing process, to ensure safety, and to prevent jamming of the tread 16 during the brushing operation.

One pass brushing of the underside surface 34 at the longitudinal ends 18 and 20 is sufficient to prepare the tread 16 for attachment to the tire carcass in the retread process for certain tread sculptures. However, for more aggressive tread patterns, for instance large open block treads, brushing the longitudinal ends 18 and 20 in only one direction may not be sufficient. Irregular finishing patches may occur in these areas of the underside surface 34 when certain types of tread 16 are processed leading to a detrimental result in the retreading process. As such, in pre-molded retread production, the tread 16 needs to be brushed in both directions 40, 42 along the entire underside surface 34 to achieve the best finishing quality. Further, if irregular patches are present after brushing, they must be manually re-brushed and this manual operation takes additional time and labor. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which:

FIG. 8 is a side elevation view of a tread being brushed and being engaged by first and second tread extensions at opposite ends.

FIG. 9 is a bottom plan view of the tread and tread extensions of FIG. 8 with the brush removed.

FIG. 12 is a side elevation view of a tread with first and second tread extensions attached to the tread with connecting devices employing clamps.

FIG. 13 is a bottom plan view of the tread and tread extensions of FIG. 12.

Figure 1:
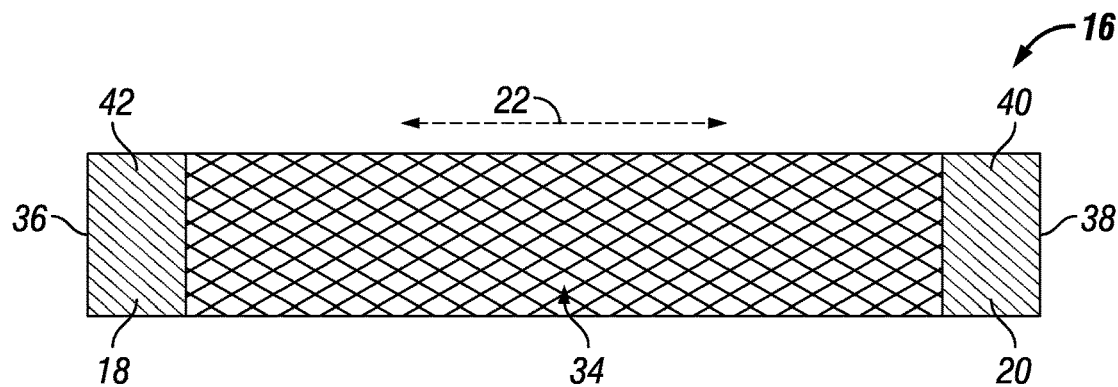
FIG. 1 is a plan view of an underside surface of tread that has been brushed both in a first direction and a second direction along only a portion of its length.

Repeat use of reference characters in the present specification and drawings is intended to represent the same or analogous features or elements.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

A tread extension device 10 is provided that engages a tread 16 used during a retreading process so that the underside surface 34 of the tread 16 can be brushed in two directions 40, 42 along its longitudinal length. The tread extension device 10 allows the longitudinal ends 18, 20 of the underside surface 34 to be brushed in both direction 40, 42 along with the section of the underside surface 34 between the two ends 18 and 20. Improved finishing quality may be obtained, and the need to manually brush the underside surface 34 to remove irregular patches may be eliminated. The tread extension device 10 can have a first tread extension 12 connected to the first longitudinal end 18 by way of a first connecting device 28. The connection is effected in such a way that the underside surface 34 at the first longitudinal end 18 is exposed and can be brushed in both directions 40, 42. A second tread extension 14 may also be utilized at the second longitudinal end 20 to allow this portion of the underside surface 34 to likewise be brushed in both directions 40, 42.

Figure 3:
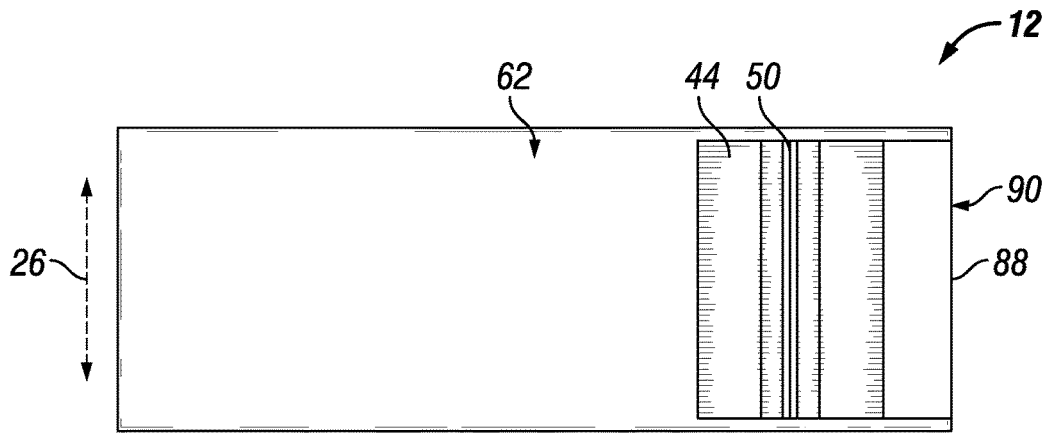
FIG. 3 is a bottom plan view of the first tread extension and base of FIG. 2.
Figure 4:
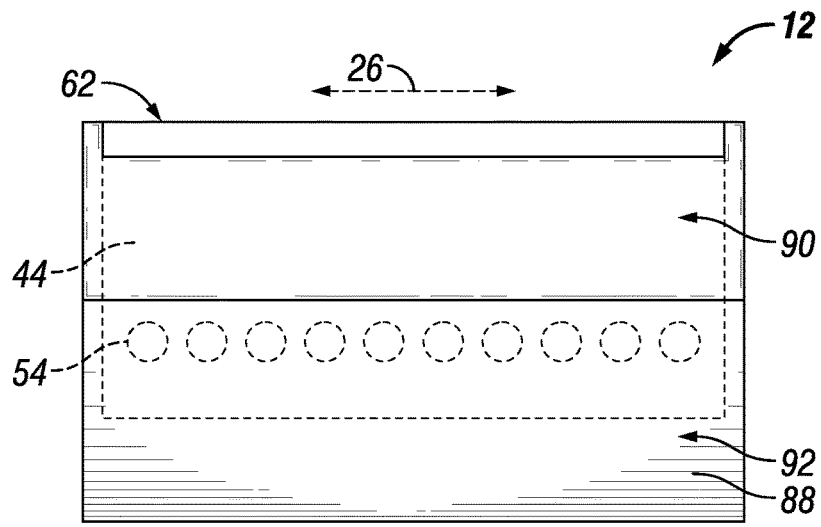
FIG. 4 is a front view of the first tread extension and base of FIG. 2.
Figure 2:
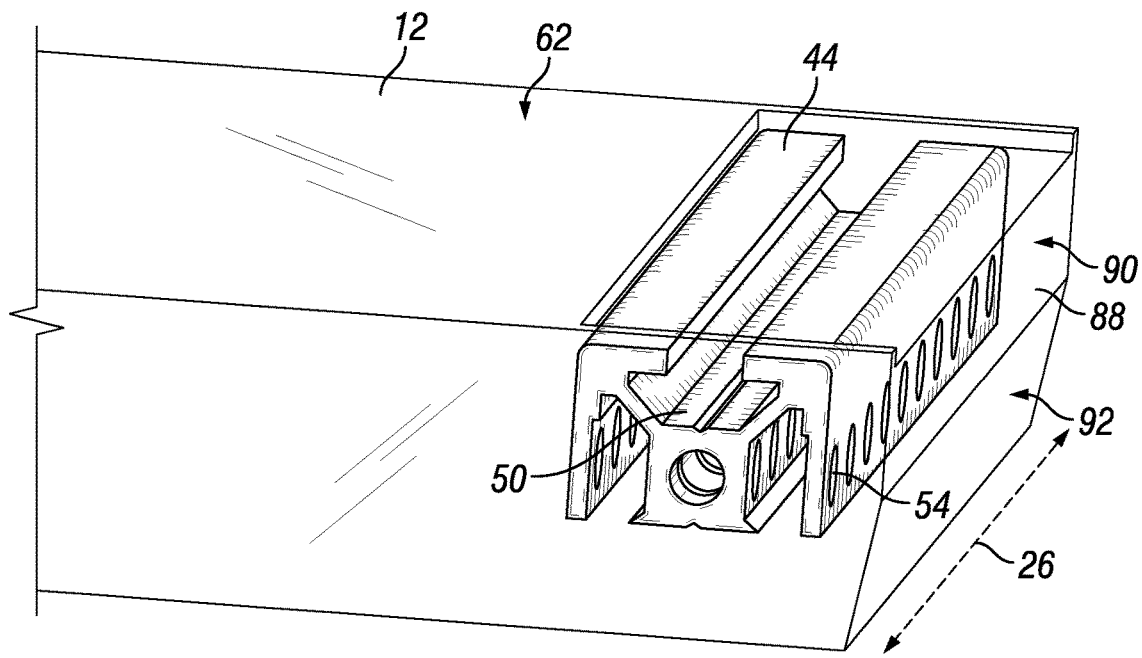
FIG. 2 is a perspective view of a first tread extension with a base in which the first tread extension is see through in order to allow the base to be observed.

FIGS. 2-4 illustrate a first tread extension 12 in accordance with one exemplary embodiment. The first tread extension 12 may be made of a material or materials similar in construction of the tread 16. The first tread extension 12 may be attached to the tread 16 by way of a first connecting device 28 that includes a base 44. The base 44 may be molded into the first tread extension 12 so that it cannot be removed from the first tread extension 12. The base 44 may be made in a variety of manners, and in the illustrated embodiment has a series of flanges that define a slot 50 that extends in a lateral direction 26 of the first tread extension 12. Various flanges of the base 44 also define a plurality of apertures 54. The base 44 can be made of a material different from that of the first tread extension 12, and in some arrangements may be made of steel, aluminum, or other types of metal. The base 44 can be molded into the first tread extension 12, and the apertures 54 may function to help better secure the base 44 during molding as material making up the first tread extension 12 can flow into the apertures 54 and set to better anchor the base 44. The design of the base 44, including the apertures 54, may be made so that sufficient interlocking geometry is present such that after curing of the first tread extension device 12 the base 44 will be firmly locked into place.

The first tread extension 12 is open over the base 44 so that the bottom portion of the base 44 is visible through the lower surface 62 of the first tread extension 12. The other side of the first tread extension 12 may be closed so that the top portion of the base 44 is not visible through the upper surface of the first tread extension 12, which is the surface opposite from the lower surface 62. The first tread extension 12 may be open from the base 44 all the way to the terminal end 88 of the first tread extension 12. The terminal end 88 that has a first planar surface 90 and a second planar surface 92. The terminal end 88 may be closed so that the base 44 is not visible through the terminal end 88. In some embodiments, the terminal end 88 may be open somewhat so that some but not all of the base 44 is visible. The first planar surface 90 is oriented with respect to the second planar surface 92 so that they are not planar with one another and so that their surface normals are not parallel to one another.

The base 44 may extend almost all of the way across the first tread extension 12 in the lateral direction 26. The base 44 can be offset from the side edges of the first tread extension 12 so that is it not on the edges of the first tread extension 12 but in between them some amount. The walls formed on either lateral side of the base 44 may be thin enough to be deformed so that the slot 50 can be accessed. In other embodiments, the base 44 may extend all the way to one or more lateral sides of the first tread extension 12 so that the slot 50 is not covered up by the first tread extension 12 but rather exposed. Here, the width of the base 44 in the lateral direction 26 may be the same as or less than the width of the first tread extension 12 in the lateral direction 26. The slot 50 may be dovetail in cross-sectional shape and can be open on its bottom surface so that it is accessible through the lower surface 62. The slot 50 may have a depression that runs its entire length that is located slightly above the dovetail shape. The base 44 may be cured into the rubber making up the first tread extension 12 to make the end of the first tread extension 12 rigid and easier for the attachment and detachment operation.

Figure 5:
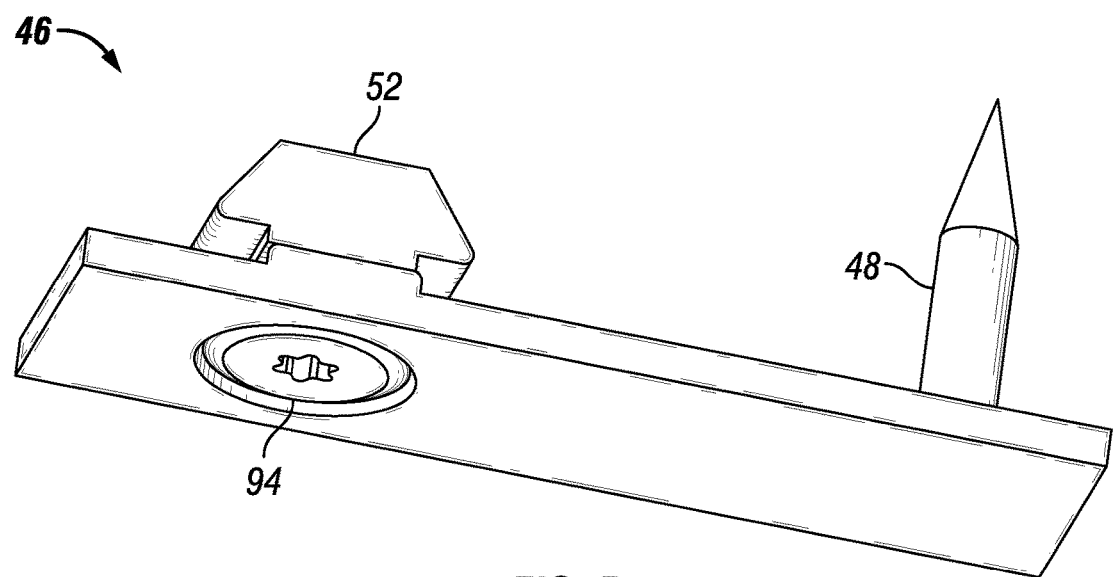
FIG. 5 is a perspective view of a needle assembly.
Figure 6:
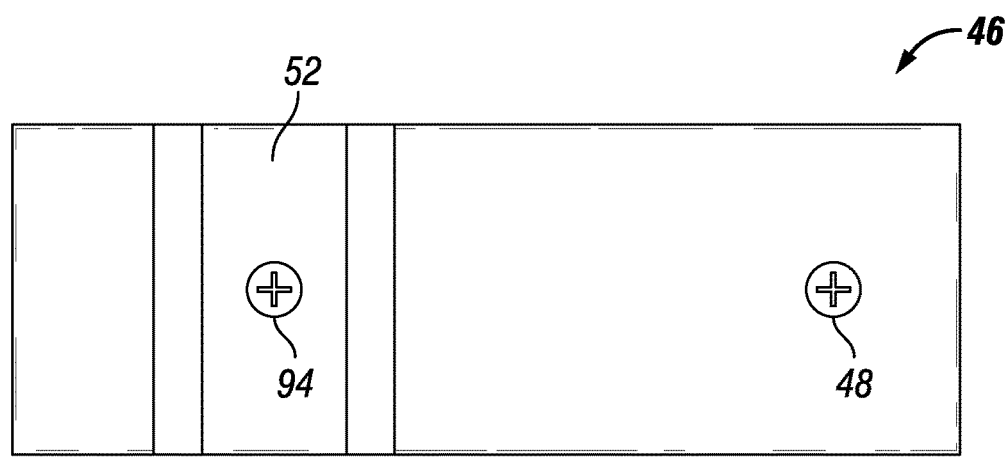
FIG. 6 is a bottom plan view of the needle assembly of FIG. 5.

FIGS. 5 and 6 show another piece of the first connecting device 28 that is the needle assembly 46. The needle assembly 46 includes a needle 48 that can be a carbide needle capable of penetrating into the tread 16. The needle 48 extends from a platform onto which a base engagement member 52 is likewise mounted. The needle 48 may be welded onto the platform. The base engagement member 52 has a cross-sectional shape in the form of a dovetail that is complimentary to the dovetail shaped slot 50. The base engagement member 52 and the needle 48 both extend from the platform in the same direction. A set pin 94 is also present that extends through the base engagement member 52 and can be tightened and released in order to move the set pin 94 out of and then into the top of the dovetail shaped portion of the base engagement member 52.

The needle assembly 46 can be assembled to the base 44 by first deforming the edges of the first tread section 12 adjacent the end of the slot 50 in order to access the slot 50. Next, the base engagement member 52 can be inserted into the slot 50 and slid along the slot 50 to a desired location in the lateral direction 26. Once the needle assembly 46 is properly located, the user may tighten the set pin 94 on the bottom surface of the base engagement member 52 so that the set pin 94 moves out of the dovetail portion and into the depression of the slot 50 that is located just above the dovetail shaped-cross section of the slot 50. The set pin 94 thus enters the depression and causes the needle assembly 46 to be locked into place relative to the base 44 so that their positions do not change relative to one another. The set pin 94 may be subsequently loosened to allow the needle assembly 46 to be moved into a different position or removed from the base 44 as desired.

Figure 7:
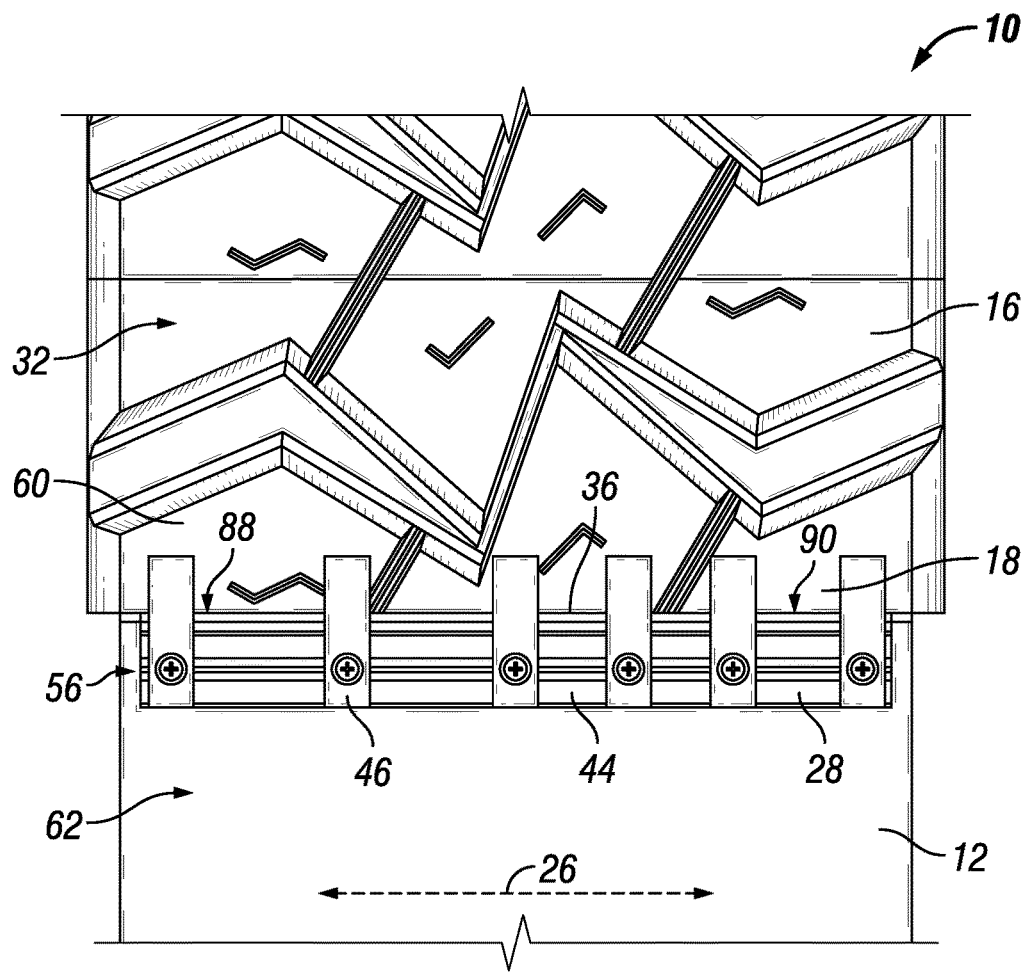
FIG. 7 is a bottom plan view of a tread extension with a first connecting device made of a base and a plurality of needle assemblies attached to a tread.

Any number of needle assemblies 46 can be utilized with the base 44 in order to provide enough securement of the first tread extension 12 to the tread 16. With reference to FIG. 7, a bottom view of the first tread extension 12 and first connecting device 28 is shown in which a plurality of needle assemblies 56 are connected to the base 44. Although six needle assemblies 56 are shown, it is to be understood that any number are possible in accordance with various exemplary embodiments. For example, from 2-5, from 5-7, from 6-10, or up to 15 needle assemblies 56 can be attached to the base 44 in various arrangements of the tread extension device 10. The needle assemblies 56 may be arranged in the same manner as previously discussed with respect to needle assembly 46, or they may be various arranged. The needle assemblies 56 may all be spaced from one another in the lateral direction 26, or they may be in engagement with one another so that sequential needle assemblies 56 touch one another. The number and location of the needle assemblies 56 should be selected so that each needle 58 of the various needle assemblies 56 engage the tread blocks 60 of the tread 16 and puncture the tread blocks 60 in order to effect a secure attachment of the first connecting device 28 to the tread 16. Although shown as extending the same distance away from the first tread extension 12, various ones of the plurality of needles 58 may extend farther from or closer to the first tread extension 12 than other ones of the plurality of needles 58. Extension of the needles 58 the same distance in the longitudinal direction 22 may allow the needle piercing positions to be balanced within the entire tread 16 length so that the tread 16 is uniformly grasped and connected.

The first tread extension 12 can be grasped when the tread 16 is brushed by the brushing machine. The lower surface 62 can be provided with a series of lateral grooves 64 that function to aid in grasping of the first tread extension 12. The lateral grooves 64 may simply extend across the width of the first tread extension 12 in the lateral direction 26, or may be sculpture that has different shapes and directions of extension. The lateral grooves 64 may help the first tread extension 12 be capable of better traction/gripping during brushing operations, but need not be present in other exemplary embodiments of the tread extension device 10.

The tread extension device 10 may also have a second tread extension 14 located at the second longitudinal end 20. FIGS. 8 and 9 show the second tread extension 14 connected to the second longitudinal end 20 by way of a second connecting device 30. The second connecting device 30 can be arranged in the same manner as previously discussed with respect to the first connecting device 28, such as having a base 44 and needle assemblies 56, and a repeat of this information is not necessary. In a similar manner, the second tread extension 14 may be arranged in a similar manner as the first tread extension 12, and a repeat of this information is not necessary. In the embodiment shown in FIGS. 8 and 9, the tread extensions 12, 14 are the same as one another with the exception of the second tread extension 14 having a pair of lateral grooves 68 on its lower surface 66 for added gripping, while the first tread extension 12 lacks any lateral grooves. The tread 16 may be precut tread with the first and second longitudinal ends 12 and 14 having the same tread pattern. In this regard, the tread 16 is cut in the same pitch position on both ends 12, 14 so that the tread pattern 16 on the ends is identical. The tread 16 can be cured before being attached to the first and second tread extensions 12, 14

Once the first and second connecting devices 28, 30 are assembled, they may be lowered onto the tread 16, or alternatively the tread 16 may be raised onto the connecting devices 28, 30. Doing so will cause the needles 48, 56 to penetrate the tread 16 and be embedded therein to in turn cause the tread 16 to be connected to the first and second tread extensions 12, 14. The first terminal end 36 of the first longitudinal end 18 may engage the terminal end 88 of the first tread extension 12. The chamfer formed by the first and second planar surfaces 90, 92 at the terminal end 88 may cause a portion of the terminal end 88 to not engage the first terminal end 36 while another portion of the terminal end 88 does in fact engage the first terminal end 36. The planar surfaces 90, 92 may allow the tread 16 and the first tread extension 12 to more easily connect to one another without jamming. Also, the angular alignment of the first and second planar surface 90, 92 may cause more compression of the material between the needle 48 and the base 44 thus causing the connection between the first tread extension 12 and the tread 16 to be more robust. The second tread extension 14 may engage the second terminal end 38 of the second longitudinal end 20 in a similar manner. Here, the terminal end of the second tread extension 14 may be provided with a pair of planar surfaces that are angled to one another to likewise cause a chamfer to assist in connection and to provide a stronger connection.

The number and location of the needle assemblies 56 are selected as needed and so that the tread blocks 60 of the tread 16 are penetrated. The needles 58 of the needle assemblies 56 are not located at grooves in the tread 16 otherwise they would not provide any assistance in penetrating the material making up the treads 16. The number and location of the needles assemblies 56 are different between the first and second connecting devices 28 and 30 due to the different tread blocks 60 located at the first and second longitudinal ends 18, 20. The needles 58 can penetrate the tread surface 32 of the tread 16 and extend into the tread 16, but not extend to the underside surface 34.

The widths of the first and second tread extensions 12, 14 in the lateral direction 26 may be the same as the width of the tread 16 in the lateral direction 26. The tread 16 has a thickness 76 that can extend in a vertical direction 24 of the tread 16. The thickness of the first and second tread extensions 12 and 14 may be the same as the thickness 76 of the tread 16 in some embodiments. However, it is to be understood that the size of the width and thickness of the tread extensions 12, 14 need not be the same as that of the tread 16 in other embodiments.

Once the first and second tread extensions 12, 14 are attached to the tread 16, the underside surface 34 of the tread 16 can be brushed by the brush 96 in order to prepare the underside surface 34. The first tread extension 12 can grasped and the tread 16 may be fed to the brush 96 so that the entire underside 34 from the first terminal end 36 to the second terminal end 38 in a longitudinal direction 22 of the tread 16 brushed in a first direction 40. The length of the underside 34 that is brushed is designed by the distance 98. The first tread extension 12 may be released and the second tread extension 14 can be grasped, the tread 16 may then be inserted into the brushing machine and the brush 96 can again brush the underside surface 34 but in a second direction 42. The distance 98 from the first to the second terminal ends 36, 38 is brushed in the longitudinal direction 22. The resulting finishing of the underside surface 34 is brushing in both directions 40, 42 along the entire underside surface 34 between and including the first and second longitudinal ends 18, 20.

One method of using the tread extension device 10 in a finishing procedure may first involve placing the tread extension device 10 in a position underneath a tread conveyor. The tread 16 that is desired to be brushed is moved to a hard stop right above the tread extension device 10. Force may be applied onto the first tread extension 12 at the location of the base 44 so that the carbide needles 48, 58 pierce the tread blocks 60 and firmly connect the tread 16 with the connecting devices 28 and the first tread extensions 12. The tread 16 will in effect be extended in the longitudinal direction 22 by one meter due to the one meter length of the first tread extension 12. The hard stop position allows the first terminal end 36 and the first tread extension 12 to have a small amount of overlap in the longitudinal direction 22, so that while the carbide needles 48, 58 pierce into the first longitudinal end 18 the connection will be firm.

The same procedure may be repeated on the second longitudinal end 20 of the tread 16 in which the carbide needles 48, 58 of the second connecting device 30 pierce the tread 16 upon pressure applied onto the base 44 of the second connecting device 30. Assuming again that the length of the second tread extension 14 is one meter in the longitudinal direction 22, the length of the tread 16 will in effect be extended another meter in the longitudinal direction 22.

After both the first and second tread extensions 12, 14 are connected to the tread 16, this assembly of tread 16 and extensions 12, 14 are passed through the brushing line so that the entire length of the underside surface 34 is brushed with the help of temporary extensions 12, 14. The extensions 12, 14 are thus attached to the tread 16 before the tread 16 moves to the finishing machine. After passing through the brushing heads, the extended tread 16 is hard stopped. Next, the first longitudinal end 18 is held while the first tread extension 12 at the base 44 is pushed so that the carbide needles 48, 58 are pushed out of the first longitudinal end 18 and so that the first tread extension 12 is detached from the tread 16.

Moving to the other end of the tread 16, the second longitudinal end 20 is held while the second tread extension 14 at the base 44 is pushed to cause the carbide needles 48, 58 to be pushed out of the second longitudinal end 20 to cause the second tread extension 14 to be detached from the tread 16. The disengaged tread extension device 10 may be moved to the next tread 16 starting position. The tread extensions 12 and 14 are thus detached after the tread 16 comes out of the finishing machine. The tread extensions 12, 14 and connecting devices 28, 30 are reusable with multiple treads 16 in the finishing process. The finishing process can be repeated for subsequent treads 16, and the tread 16 engagement and disengagement procedures can be fully automated. This automation may provide minimum or no additional cycle time and operational cost impact.

The use of the tread extension device 10 may cause holes to be pierced into the first and second longitudinal ends 18 and 20 of the tread 16. However, the tread 16 after finishing is typically shaved so that rubber at the terminal ends 36 and 38 is removed. This removal during the retreading process keeps the tread 16 fresh and active for improved joining of the tread 16 to the tire carcass. As such, the puncturing of the tread 16 at the longitudinal ends 18, 20 will not cause additional material loss and will not result in the tread 16 having puncture holes when placed onto the tire carcass. The process can be automated in that the needles 58 can be automatically pressed into the tread 16 on both ends 18, 20 to automatically attach the first and second tread extensions 12, 14 into the tread 16. The brushing can be automatically done so that the tread 16 is brushed in the first and second directions along its entire length. Once completed, the needles 56 can be automatically pulled from the ends 18, 20 to detach the first and second tread extensions 12, 14 from the tread 16. The tread 16 can then be moved to the next processing stage. The ability to add automation to the process may result in cost savings, repeatability, and speed in manufacture.

Figure 10:
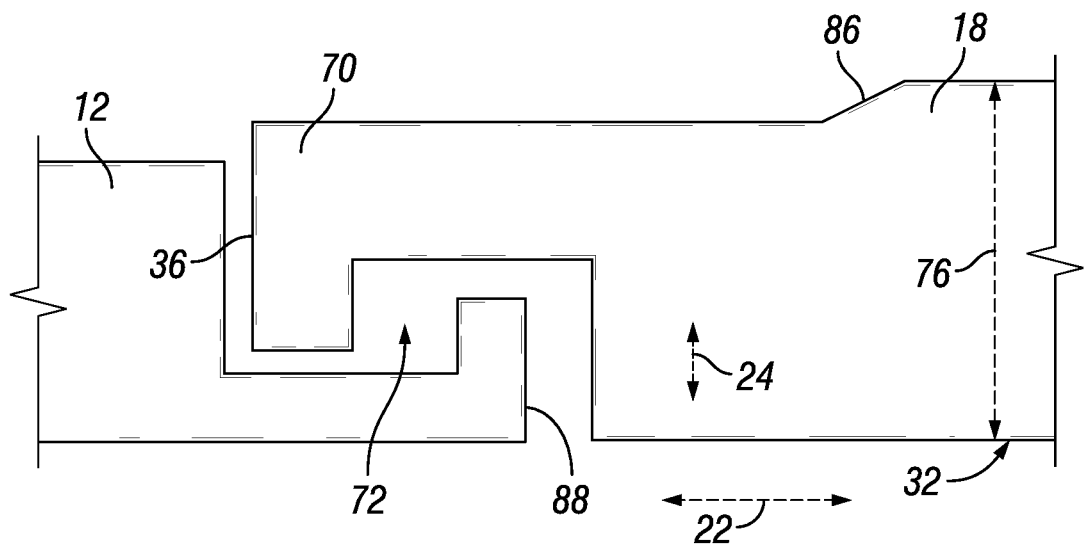
FIG. 10 is a side view of a first tread extension that has a languette receiving portion positioned with a languette of a tread.

The connecting devices 28, 30 and tread extensions 12, 14 of the tread extension device 10 can be provided in different configurations in other exemplary embodiments. FIG. 10 shows a first tread extension 12 that may be made of material that is the same as or similar to that of the tread 16. The first tread extension 12 features a languette receiving portion 72 that extends across the entire width of the first tread extension 12 in the lateral direction 26. The languette receiving portion 72 is spaced from the terminal end 88 of the first tread extension 12. The shape of the languette portion 70 corresponds to that of the languette receiving portion 72 but they are not sized and shaped to be completely complimentary when they are arranged into one another but not clamped or otherwise attached to one another. In this regard, some space is present between the two components 70, 72 so that there is some space present in the longitudinal direction 22 and some space between them in the vertical direction 24. However, they are close to but not completely in complimentary shape with one another. Further, the upper surface of the languette portion 70 may be above that of the upper surface of the first tread extension 12 in the vertical direction 24.

Figure 11:
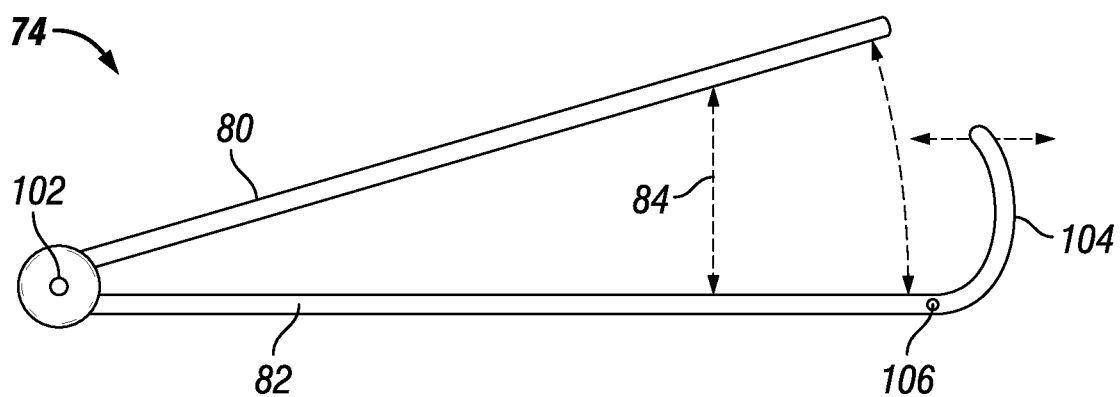
FIG. 11 is a side elevation view of a clamp.

With reference to FIG. 11, a clamp 74 can be included as part of the first connecting device 28 and features a first plate 80 and a second plate 82 that are separated a distance 84 from one another. The clamp 74 can be actuated manually or automatically in order to cause the plate 80 to pivot about the arm pivot 102 towards the plate 82 or away from the plate 82. The distance 84 can then be made larger or smaller, and the path of motion of the plate 80 is shown in dashed lines. The clamp 74 also has a locking mechanism 104 at the end of the second plate 82. The locking mechanism 104 rotates about the lock pivot 106 so to rotate in the direction of the dashed lines shown. When the first plate 80 is moved close to the second plate 82 the locking mechanism 104 can be rotated against the first plate 80 to lock the first plate 80 in place so that it cannot rotate away from the second plate 82 such that the distance 84 cannot be extended. When release is desired, the locking mechanism 104 can be pulled upon in order to be disengaged from the first plate 80 to allow the first plate 80 to rotate back into the open position. The clamp 74 arrangement shown is only exemplary and any other type of clamping arrangement can be used to effect locking pressure between the plates 80 and 82.

FIGS. 12 and 13 illustrate the attachment of the first and second tread extensions 12, 14 to the tread 16 using the connecting devices 28 and 30 that utilize clamps 74 in combination with the languette portions 70 of the tread 16. The languette portion 70 may be present on the tread 16 for use in de-molding in the curing operation, and this component may be left on the tread 16 untrimmed until the finishing operation is complete. The languette portion 70 meets the underside surface 34 at an engagement location 86. From the engagement location 86, the languette portion 70 slopes upward in the vertical direction 24 toward the tread surface 32 and then levels out. The languette portion 70 has a semi-circular portion that is received within the complimentary shaped languette receiving portion 72. The thickness of the first tread extension 12 is less than the thickness 76 of the tread 16. The plates 80, 82 of the clamp 74 are applied to the languette portion 70 and the first tread extension 12 and engage both of these components 12, 70. The clamp 74 can be tightened so that pressure is applied to these components 12, 70 to hold them to one another. The interlocking shapes of the languette portion 70 and the languette receiving portion 72 also help to keep the first tread extension 12 attached to the tread 16. The distance 84 from the first plate 80 to the second plate 82 is less than the thickness 76. This arrangement takes place when the clamp 74 is attached when the underside surface 34 is being brushed. As previously discussed, the languette portion 70 and the languette receiving portion 72 are close to but not exactly in complimentary shape with one another. Pressure from the clamp 74 will cause the components 70 and 72 to deform and be squeezed into complimentary shape with one another for secure engagement. The brush 96 may then travel along the underside surface 34 and then on top of the first plate 80 as the first plate 80 is located flush with the underside surface 34. The first plate 80 may extend the entire width of the first tread extension 12 and the tread 16 in the lateral direction 26, and in some instances may be longer in the lateral direction 26 than the first tread extension 12 and tread 16.

The underside surface 34 may be brushed in the first direction 40 along its entire length in the longitudinal direction 22 from the engagement location 86 to the opposite engagement location 100. Engagement location 100 is located at the junction of the underside surface 86 and the languette portion that is attached to the clamp at the second connecting device 30. The engagement location 100 is at the point the underside surface 86 contacts the upward direction of the languette portion in the vertical direction 24. It is to be understood that other arrangements of the tread 16 are possible in which the languette portions 70 do not move upwards but instead have bottom surfaces that are flush with the underside surface 34. In these designs, the first plate 80 may be located below the underside surface 34 in the vertical direction 24, or may be pressed with such force that it is pushed into the languette portion 70 to result in the first plate 80 being flush with the underside surface 34. The placement of the first plate 80 to be flush with the underside surface 34 may help to reduce wear on the first plate 80 and brush 96 through repeated passes as less pressure and contact between these components may take place. The first plate 80 may in some embodiments even be located higher than the underside surface 34 to further reduce wear during multiple passes of the finishing operation. The first plate 80 may be a carbide plate so that it is wear resistant under brushing operations.

The first tread extension 12 may be released, and the second tread extension 14 can be grasped and the tread 16 can again be run through the brush 96 to cause the underside surface 34 to be brushed in the second direction 42. The plate of the clamp of the second connecting device 30 may be flush with the underside surface 34 in the vertical direction 24 to ensure that wear on the brush 96 and plate is minimized, and to prevent jamming of the tread extension device 10 during operation.

The first and second connecting devices 28, 30 utilize the clamps 74 so that the tread 16 is not punctured by the connecting devices 28, 30 during attachment. The connecting device 30 can be arranged in the same manner as connecting device 28 with respect to the languette portion 70, languette receiving portion 72, and clamp 74, and a repeat of this information is not necessary. Further, in some arrangements one of the connecting devices 28, 30 may utilize the base 44 and needle assembly 46, while the other one of the connecting devices 28, 30 uses the languette portion 70, languette receiving portion 72, and clamp 74. The clamp 74 can be variously arranged in other embodiments and can be any type of arrangement that allows the plates 80, 82 to be pushed towards one another and held. In some embodiments, the clamp 74 can be a toggle clamp.

While the present invention has been described in connection with certain embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. A tread extension device, comprising:
    a first tread extension;
    a second tread extension, wherein a tread that has a first longitudinal end and a second longitudinal end is located between the first and second tread extensions, wherein a longitudinal direction of the tread extends from the first longitudinal end to the second longitudinal end;
    a first connecting device that connects the first tread extension to the first longitudinal end of the tread, wherein the first connecting device engages both the first tread extension and the first longitudinal end of the tread; and
    a second connecting device that connects the second tread extension to the second longitudinal end of the tread, wherein the second connecting device engages both the second tread extension and the second longitudinal end of the tread;
    wherein the tread has a tread surface and an underside surface, wherein the tread surface is opposite from the underside surface in a vertical direction of the tread, wherein the tread surface is configured for engaging a road surface, wherein the first connecting device has a needle assembly that has a needle that punctures the tread surface and connects the needle assembly to the tread.

2. The tread extension device as set forth in claim 1, wherein the tread has a first terminal end located at the first longitudinal end of the tread, wherein the tread has a second terminal end located at the second longitudinal end of the tread, and wherein the underside surface is brushed in a first direction and is brushed in a second direction along the entire underside surface from the first terminal end of the tread to the second terminal end of the tread.

3. The tread extension device as set forth in claim 1, wherein the first connecting device has a base that is cured into the first tread extension, wherein the needle assembly is carried by the base.

4. The tread extension device as set forth in claim 3, wherein the base has a slot that extends in a lateral direction of the first tread extension, wherein the needle assembly has a base engagement member that is disposed within the slot and is adjustable along the slot in order to position the needle assembly at different locations at the base in the lateral direction.

5. The tread extension device as set forth in claim 3, wherein the base is made of a different material than the first tread extension, and wherein the base is molded into the first tread extension, wherein the base has a plurality of apertures into which the first tread extension is located and that assist in the attachment of the base to the first tread extension.

6. The tread extension device as set forth in claim 3, wherein the needle assembly is a first needle assembly, and wherein the needle is a first needle, and further comprising a plurality of needle assemblies carried by the base, wherein the first needle assembly is included in the plurality of needle assemblies, wherein each one of the plurality of needle assemblies has a needle, wherein the tread has a plurality of tread blocks, and wherein the first needle and the needles of the plurality of needle assemblies puncture the plurality of tread blocks and connect the first needle assembly and the plurality of needle assemblies to the tread.

7. The tread extension device as set forth in claim 1, wherein the first tread extension has a lower surface, and wherein a plurality of lateral grooves extend in a lateral direction of the first tread extension at the lower surface of the first tread extension; and wherein the second tread extension has a lower surface, and wherein a plurality of lateral grooves extend in a lateral direction of the second tread extension at the lower surface of the second tread extension.

8. The tread extension device as set forth in claim 1, wherein the first tread extension has a terminal end that is adjacent the tread, wherein the terminal end of the first tread extension has a first planar surface and a second planar surface, wherein the first planar surface is not located in the same plane as the second planar surface.

9. The tread extension device as set forth in claim 1, wherein the first tread extension is made of rubber, and wherein the second tread extension is made of rubber.

10. A tread extension device, comprising:
a first tread extension;
a second tread extension, wherein a tread that has a first longitudinal end and a second longitudinal end is located between the first and second tread extensions, wherein a longitudinal direction of the tread extends from the first longitudinal end to the second longitudinal end;
a first connecting device that connects the first tread extension to the first longitudinal end of the tread, wherein the first connecting device engages both the first tread extension and the first longitudinal end of the tread; and
a second connecting device that connects the second tread extension to the second longitudinal end of the tread, wherein the second connecting device engages both the second tread extension and the second longitudinal end of the tread;
wherein the first connecting device has a base that is cured into the first tread extension, wherein the first connecting device has a needle assembly that is carried by the base and that has a needle that punctures the tread and connects the needle assembly to the tread;
wherein the base has a slot that extends in a lateral direction of the first tread extension, wherein the needle assembly has a base engagement member that is disposed within the slot and is adjustable along the slot in order to position the needle assembly at different locations at the base in the lateral direction;
wherein the base engagement member has a dove tail shaped cross-section, and wherein the slot has a dove tail shaped cross-section.

11. A tread extension device, comprising:
a first tread extension;
a second tread extension, wherein a tread that has a first longitudinal end and a second longitudinal end is located between the first and second tread extensions, wherein a longitudinal direction of the tread extends from the first longitudinal end to the second longitudinal end;
a first connecting device that connects the first tread extension to the first longitudinal end of the tread, wherein the first connecting device engages both the first tread extension and the first longitudinal end of the tread; and
a second connecting device that connects the second tread extension to the second longitudinal end of the tread, wherein the second connecting device engages both the second tread extension and the second longitudinal end of the tread;
wherein the tread has a projection portion located at the first longitudinal end of the tread, wherein the first tread extension has a projection receiving portion into which the projection portion is received, wherein the first connecting device is a clamp that engages the projection portion and the first tread extension;
wherein the tread has a thickness that extends in a vertical direction of the tread from an underside surface of the tread to a tread surface of the tread, wherein the clamp has a first plate that engages the projection portion and is located lower than the underside surface of the tread in the vertical direction of the tread;
wherein the first plate is a carbide plate.

12. A tread extension device, comprising:
a first tread extension;
a second tread extension, wherein a tread that has a first longitudinal end and a second longitudinal end is located between the first and second tread extensions, wherein a longitudinal direction of the tread extends from the first longitudinal end to the second longitudinal end;
a first connecting device that connects the first tread extension to the first longitudinal end of the tread, wherein the first connecting device engages both the first tread extension and the first longitudinal end of the tread; and
a second connecting device that connects the second tread extension to the second longitudinal end of the tread, wherein the second connecting device engages both the second tread extension and the second longitudinal end of the tread;
wherein the tread has a projection portion located at the first longitudinal end of the tread, wherein the first tread extension has a projection receiving portion into which the projection portion is received, wherein the first connecting device is a clamp that engages the projection portion and the first tread extension;
wherein the tread has an underside surface that engages the projection portion.

13. A tread extension device, comprising:
a first tread extension;
a second tread extension, wherein a tread that has a first longitudinal end and a second longitudinal end is located between the first and second tread extensions, wherein a longitudinal direction of the tread extends from the first longitudinal end to the second longitudinal end;
a first connecting device that connects the first tread extension to the first longitudinal end of the tread, wherein the first connecting device engages both the first tread extension and the first longitudinal end of the tread, wherein the first connecting device comprising a different material than the first tread extension; and
a second connecting device that connects the second tread extension to the second longitudinal end of the tread, wherein the second connecting device engages both the second tread extension and the second longitudinal end of the tread, wherein the second connecting device comprising a different material than the second tread extension;
wherein the tread has a projection receiving portion located at the first longitudinal end of the tread, wherein the first tread extension has a projection portion that is received within the projection receiving portion, wherein the first connecting device is a clamp that engages the projection receiving portion and the first tread extension;

wherein the tread has an underside surface that engages the projection receiving portion.

\* \* \* \* \*